(12) United States Patent
Ritchie et al.

(10) Patent No.: US 10,612,316 B2
(45) Date of Patent: Apr. 7, 2020

(54) ARTICULATED UNIVERSAL JOINT WITH BACKLASH REDUCTION

(71) Applicant: TURBO DRILL INDUSTRIES, INC., Conroe, TX (US)

(72) Inventors: Sheldon Ritchie, Conroe, TX (US); Chad Feddema, Conroe, TX (US)

(73) Assignee: TURBO DRILL INDUSTRIES, INC., Conroe, TX (US)

( * ) Notice: Subject to any disclaimer, the term of this patent is extended or adjusted under 35 U.S.C. 154(b) by 104 days.

(21) Appl. No.: 16/046,694

(22) Filed: Jul. 26, 2018

(65) Prior Publication Data

US 2019/0032421 A1  Jan. 31, 2019

Related U.S. Application Data (60) Provisional application No. 62/537,607, filed on Jul. 27, 2017.

(51) Int. Cl.

| | | |
|---|---|---|
| *E21B 17/00* | (2006.01) | |
| *E21B 4/02* | (2006.01) | |
| *F16D 3/72* | (2006.01) | |
| *E21B 17/05* | (2006.01) | |
| *F16D 3/64* | (2006.01) | |

(52) U.S. Cl.
CPC ............... *E21B 17/00* (2013.01); *E21B 4/02* (2013.01); *E21B 17/05* (2013.01); *F16D 3/64* (2013.01); *F16D 3/72* (2013.01)

(58) Field of Classification Search
CPC ... E21B 17/00; E21B 4/02; E21B 4/00; E21B 4/003; E21B 4/006; E21B 17/05; F16D 3/64; F16D 3/72; F16D 1/06; F16H 55/18; Y02T 10/7018; Y10T 64/19623
See application file for complete search history.

(56) References Cited

U.S. PATENT DOCUMENTS

| | | | |
|---|---|---|---|
| 2,651,530 A | 9/1953 | Blydenburgh | |
| 3,832,020 A | 8/1974 | McCloskey | |
| 4,309,061 A | 1/1982 | Teramachi | |
| 4,492,276 A * | 1/1985 | Kamp | E21B 4/02 175/61 |
| 4,778,349 A | 10/1988 | Browning | |
| 4,844,180 A * | 7/1989 | Zijsling | E21B 44/005 175/107 |
| 6,092,610 A * | 7/2000 | Kosmala | E21B 4/20 175/61 |
| 7,234,543 B2 * | 6/2007 | Schaaf | E21B 3/02 175/106 |

(Continued)

OTHER PUBLICATIONS

International Search Report and Written Opinion issued in PCT/US2018/043942, dated Oct. 15, 2018, 10 pages.

*Primary Examiner* — Yong-Suk Ro
(74) *Attorney, Agent, or Firm* — Adolph Locklar (57) ABSTRACT

A universal joint includes a joint housing and a joint shaft. The joint housing includes a socket having one or more recesses. The joint shaft includes a head positioned in the socket of the joint housing. The head includes one or more lobes corresponding with the recesses of the socket. The universal joint includes a drive key positioned between each lobe drive face and each recess drive face and an anti-backlash key positioned between each lobe back face and each recess back face.

21 Claims, 6 Drawing Sheets

(56) References Cited

U.S. PATENT DOCUMENTS

| | | | |
|---|---|---|---|
| 7,318,492 B2* | 1/2008 | Watson | E21B 7/064 |
| | | | 175/336 |
| 7,845,430 B2* | 12/2010 | Johnson | E21B 7/064 |
| | | | 175/334 |
| 10,267,090 B2* | 4/2019 | Savage | E21B 4/02 |
| 2005/0109542 A1* | 5/2005 | Downton | E21B 7/062 |
| | | | 175/73 |
| 2010/0313692 A1 | 12/2010 | Wenzel | |
| 2011/0147091 A1 | 6/2011 | Bullin | |
| 2013/0288810 A1 | 10/2013 | Foote et al. | |

* cited by examiner

SECTION A-A
FIG.4

SECTION B-B
FIG.5

SECTION C-C
FIG.6

FIG.7

ARTICULATED UNIVERSAL JOINT WITH BACKLASH REDUCTION

CROSS-REFERENCE TO RELATED APPLICATIONS

This application is a non-provisional application which claims priority from U.S. provisional application No. 62/537,607, filed Jul. 27, 2017, which is incorporated by reference herein in its entirety.

TECHNICAL FIELD/FIELD OF THE DISCLOSURE

The present disclosure relates generally to power transmission mechanisms, and specifically to universal joints.

BACKGROUND OF THE DISCLOSURE

During a drilling operation, a drill bit may be rotated by rotation of the entire drilling string or by the use of a downhole motor. Typical downhole motors are positive displacement motors that include progressive cavity or Moineau pumps. Progressive cavity pumps traditionally include a stator and a multi-lobed eccentrically rotating rotor. Fluid flow through the stator causes eccentric rotation of the rotor. The eccentric rotation is typically transferred to a concentrically rotating drive shaft by a transmission assembly. In some instances, the transmission includes a transmission shaft coupled to the drive shaft and rotor by universal joints. Because downhole motors are used to rotate the drill bit in a single direction, the universal joints are typically designed to transfer rotational forces in one direction. However, during certain operations or operating conditions, the rotation of the drill bit and drive shaft may suddenly increase in speed relative to the transmission shaft, causing sudden rotational loading on the universal joint in the opposite direction. This change in speed may be caused, for example and without limitation, when the downhole motor is stopped and started, due to frictional effects such as stick-slip of the drill bit wherein the drill bit is periodically stopped due to frictional effects between the drill bit and the formation, or during other operations of the downhole motor. Backlash, defined as the looseness or play between adjacent moveable parts, within the universal joints may cause damage to the components of the universal joints as the components of the universal joints are loaded in the opposite direction to usual. In some cases, the backlash may allow components of the universal joints to suddenly contact each other, causing shock loading to the components.

SUMMARY

The present disclosure provides for a universal joint. The universal joint may include a joint housing. The joint housing may include a socket including a recess. The recess may include a recess drive face and a recess back face. The universal joint may include a joint shaft including a head. The head may be positioned in the socket. The head may include a lobe corresponding with the recess of the socket. The lobe may include a lobe drive face corresponding with the recess drive face and a lobe back face corresponding with the recess back face. The universal joint may include a drive key positioned between the lobe drive face and the recess drive face. The universal joint may include an anti-backlash key positioned between the lobe back face and the recess back face.

The present disclosure also provides for a downhole tool. The downhole tool may include a mud motor including a stator and a rotor. The downhole tool may include a drive shaft. The downhole tool may include a transmission shaft coupled to at least one of the rotor and the drive shaft by a universal joint. The universal joint may include a joint housing. The joint housing may include a socket including a recess. The recess may include a recess drive face and a recess back face. The joint housing may be mechanically coupled to the rotor or the drive shaft. The universal joint may include a joint shaft including a head. The head may be positioned in the socket. The head may include a lobe corresponding with the recess of the socket. The lobe may include a lobe drive face corresponding with the recess drive face and a lobe back face corresponding with the recess back face. The joint shaft may be mechanically coupled to the transmission shaft. The universal joint may include a drive key positioned between the lobe drive face and the recess drive face. The universal joint may include an anti-backlash key positioned between the lobe back face and the recess back face.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
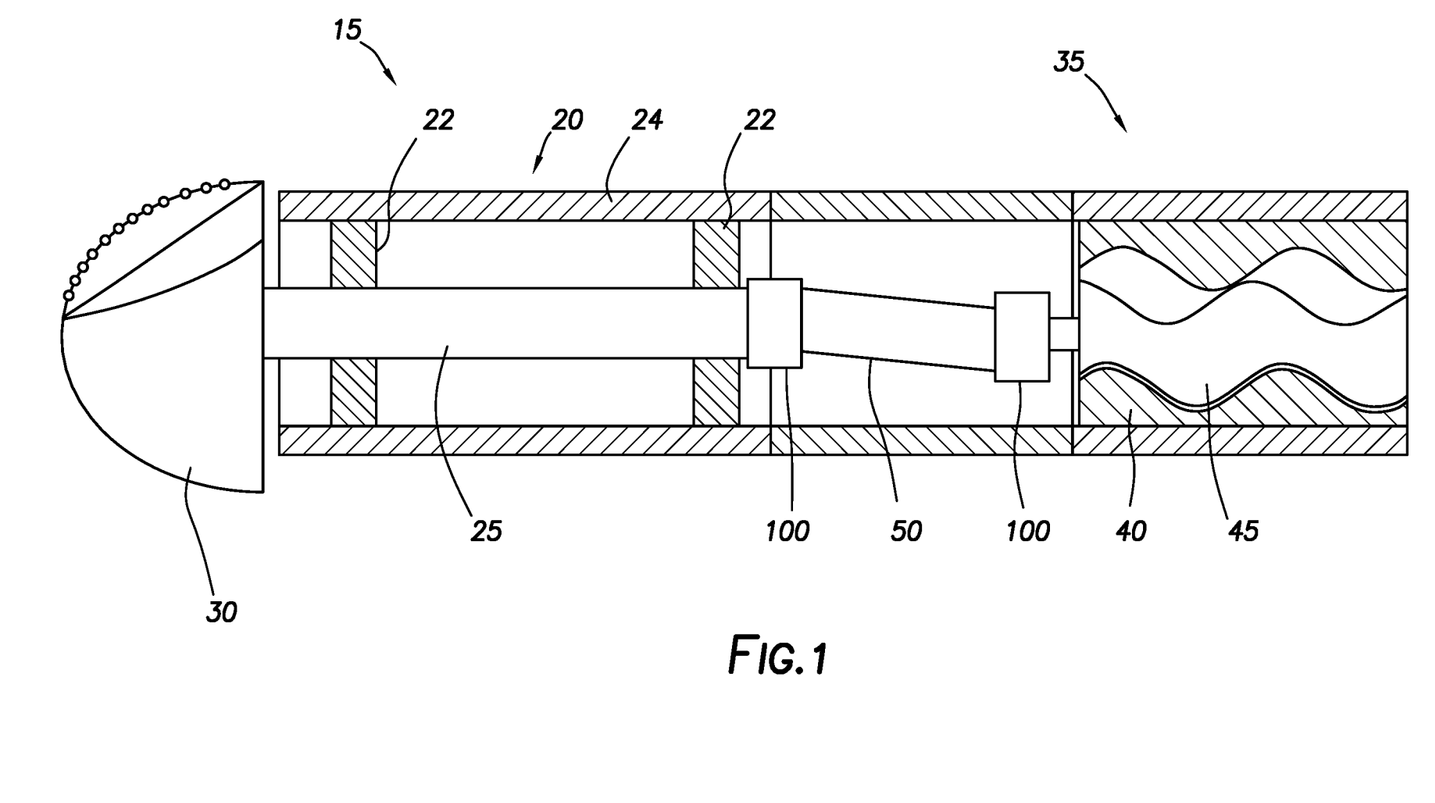
FIG. 1 is a partial schematic cross section view of a downhole tool having a universal joint consistent with at least one embodiment of the present disclosure.
Figure 2A:
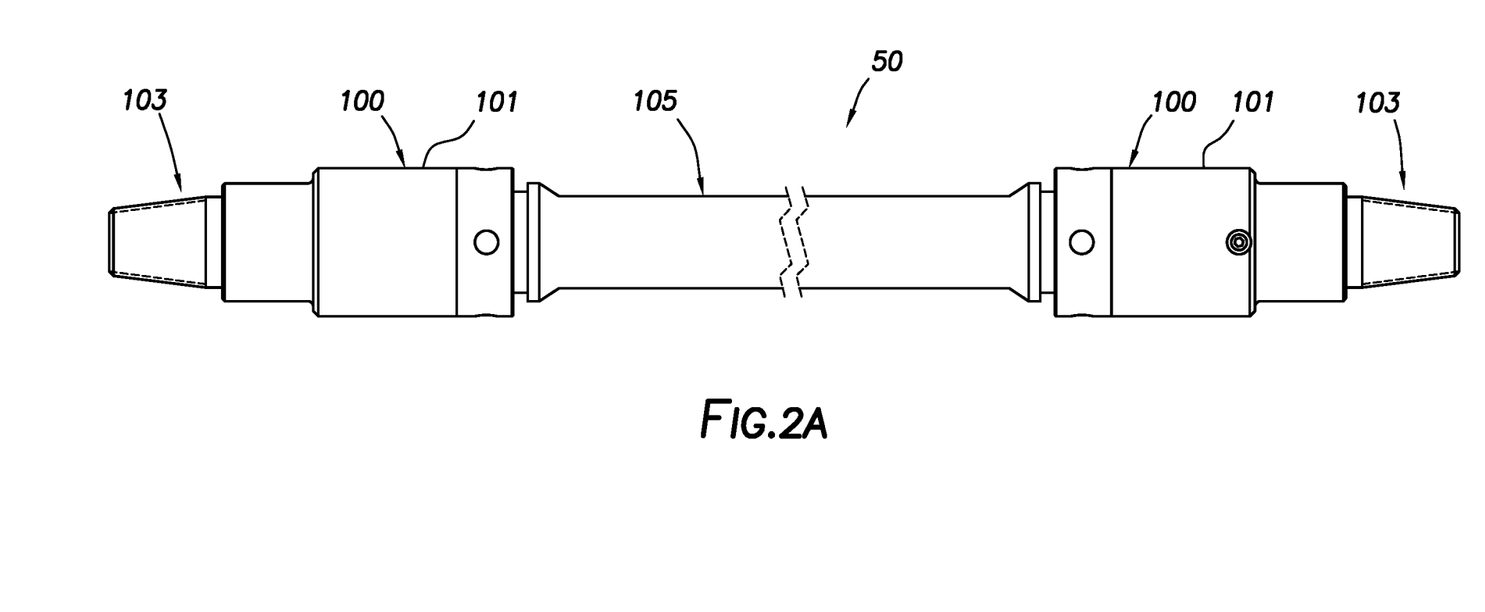
FIG. 2A is a side view of a universal joint consistent with at least one embodiment of the present disclosure.
Figure 2B:
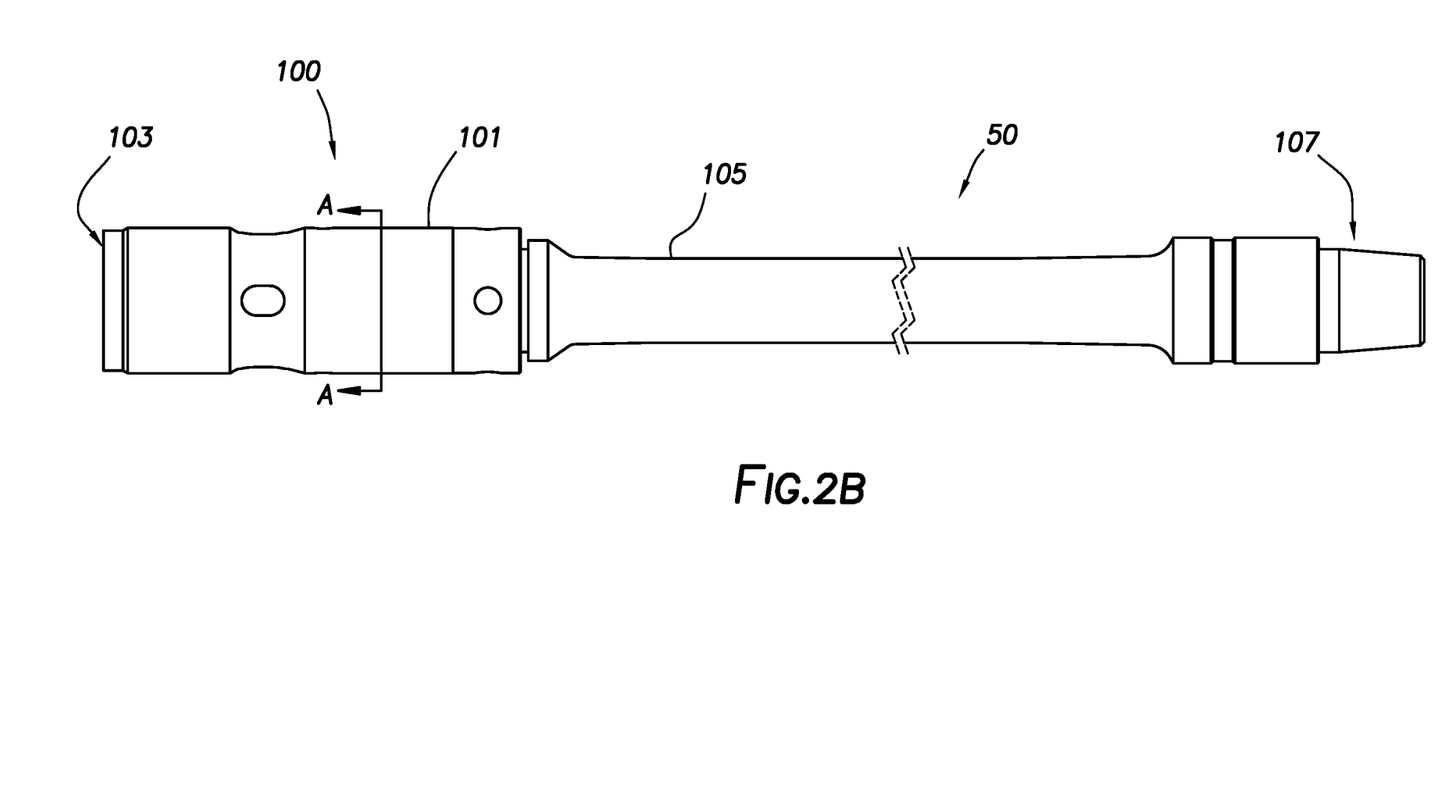
FIG. 2B is a side view of a universal joint consistent with at least one embodiment of the present disclosure.
Figure 3:
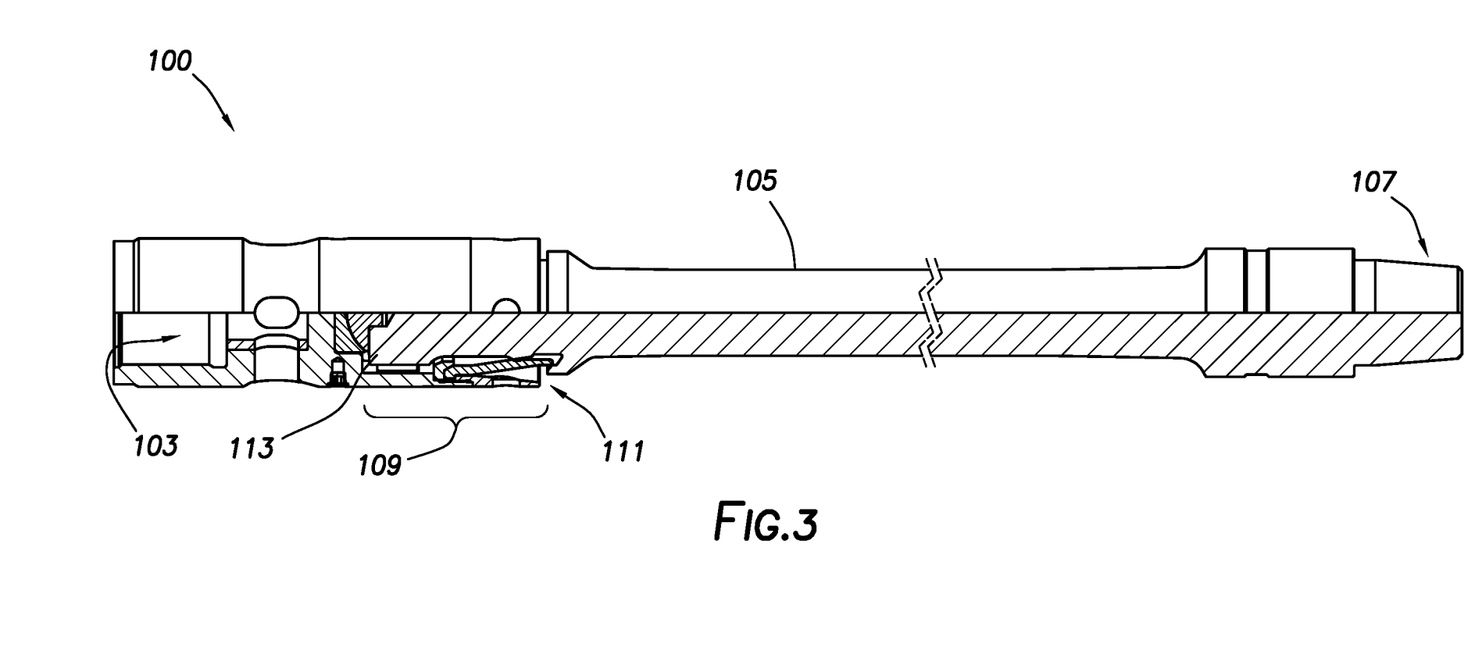
FIG. 3 is a partial cross section view of the universal joint of FIG. 2B.

FIG. 1 depicts a schematic cross section view of downhole tool 15. In some embodiments, downhole tool 15 may be a bottomhole assembly (BHA) of a drill string. In some embodiments, downhole tool 15 may include bearing assembly 20. Bearing assembly 20 may include one or more bearings 22 to couple bearing housing 24 to drive shaft 25. Drive shaft 25 may be mechanically coupled to drill bit 30. In some embodiments, drive shaft 25 and drill bit 30 may rotate relative to bearing housing 24. In some embodiments, downhole tool 15 may include mud motor 35. Mud motor 35 may be a positive displacement progressive cavity pump and may include stator 40 and rotor 45. Rotor 45 may eccentrically rotate within stator 40 as drilling fluid is pumped through mud motor 35. In some embodiments, rotor 45 may be mechanically coupled to drive shaft 25 by transmission shaft 50. Transmission shaft 50 may transfer rotation from eccentrically rotating rotor 45 to concentrically rotating drive shaft 25. In some embodiments, transmission shaft 50 may mechanically couple to rotor 45, drive shaft 25, or both by universal joint 100. As used herein, a "universal joint" is a device that connects rigid members whose axes may be inclined to each other and for transferring rotary motion between the two rigid members. For the purposes of this disclosure, the term "universal joint" includes constant velocity joints. In some embodiments, as depicted in FIG. 2A, each end of transmission shaft 50 may be mechanically coupled to a respective universal joint 100. In some embodiments, as depicted in FIG. 2B, transmission shaft 50 may be mechanically coupled to universal joint 100 at a first end and may include shaft coupler 107 at the other end. Shaft coupler 107 may allow transmission shaft 50 to directly couple to a shaft having a corresponding coupler such as rotor 45 or drive shaft 25. In some embodiments, shaft coupler 107 may be, for example and without limitation, a male or female threaded coupler for coupling to rotor 45 or drive shaft 25, splined coupling, welded connection, or any other suitable coupler.

In some embodiments, as depicted in FIGS. 2A-7, universal joint 100 may include joint housing 101. Joint housing 101 may be generally cylindrical. Joint housing 101 may include coupler 103 formed at a first end of joint housing 101 and socket 111 formed at a second end of joint housing 101. Joint housing 101 may include coupler 103 positioned to couple to an input or output shaft such as, for example and without limitation, drive shaft 25 or rotor 45 as shown in FIG. 1. In some embodiments, coupler 103 may be, for example and without limitation, a male or female threaded coupler allowing a shaft having a corresponding coupler such as drive shaft 25 or rotor 45 splined coupling, welded connection, or any other suitable coupler. Universal joint 100 may include joint shaft 105.

In some embodiments, universal joint 100 may include joint shaft 105. Joint shaft 105 may include head 109 positioned within socket 111 of joint housing 101 to mechanically couple joint shaft 105 to joint housing 101. As further discussed below, head 109 may be positioned within one or more corresponding structures of socket 111 such that rotary motion is transferred between joint shaft 105 and joint housing 101 despite any angular misalignment between the axes of rotation of joint shaft 105 and joint housing 101. In some embodiments, joint shaft 105 may be mechanically coupled to or formed as part of transmission shaft 50 as shown in FIG. 1. In an embodiment in which two universal joints 100 are used such as depicted in FIG. 2A, joint shaft 105 may include two heads 109 positioned within the socket 111 of the respective joint housings 101.

In some embodiments, head 109 of joint shaft 105 may include one or more lobes 113 that extend radially outward from joint shaft 105 to engage one or more corresponding recesses 115 formed in socket 111 of joint housing 101. Lobes 113 may, in some embodiments, act to transfer rotational force between joint shaft 105 and joint housing 101. Each lobe 113 may include lobe drive face 113a that engages with a recess drive face 115a of each corresponding recess 115 of socket 111 when universal joint 100 is used to transfer rotational forces in the drive direction, denoted D in FIG. 4. In some embodiments, each lobe 113 may include lobe back face 113b and each recess 115 may include recess back face 115b. Because universal joint 100 is used to rotate drill bit 30 in a single direction D, back faces 113b and 115b are not used to transfer rotational forces during normal operation. However, during certain operations or operating conditions, rotation of drill bit 30 may change or suddenly increase in speed, causing back faces 113b and 115b to be rotationally loaded, referred to herein as reverse loading of universal joint 100. For example and without limitation, reverse loading between back faces 113b and 115b may occur when mud motor 35 is stopped and started, due to frictional effects such as stick-slip of drill bit 30 wherein drill bit 30 periodically stops due to frictional effects between drill bit 30 and the formation, or during other operation of downhole tool 15.

Figure 4:
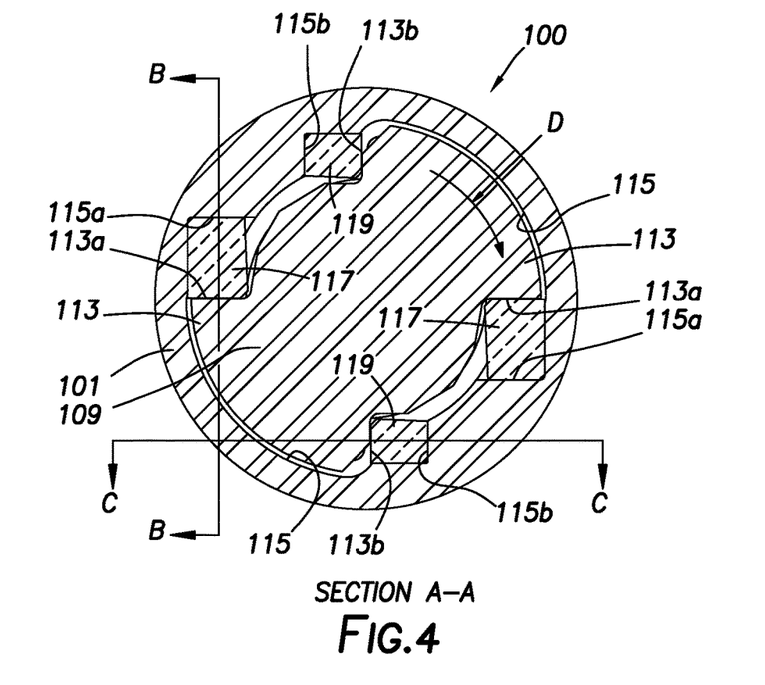
FIG. 4 is a cross section view of the universal joint of FIG. 2B taken at line A-A.
Figure 5:
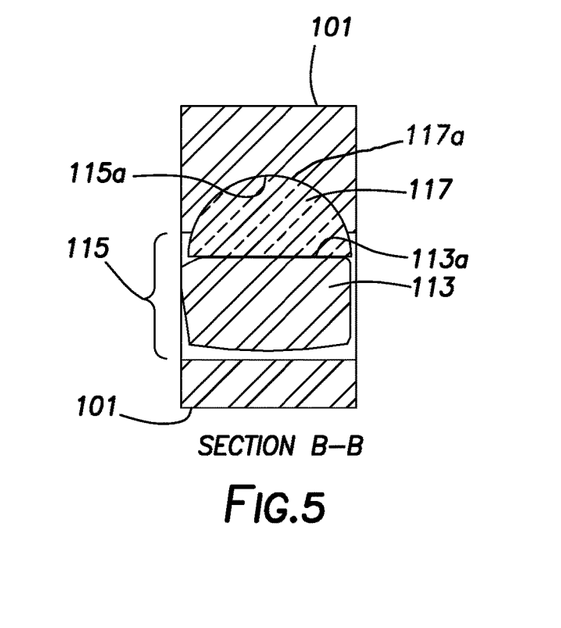
FIG. 5 is a cross section view of the universal joint of FIG. 4 taken at line B-B.
Figure 6:
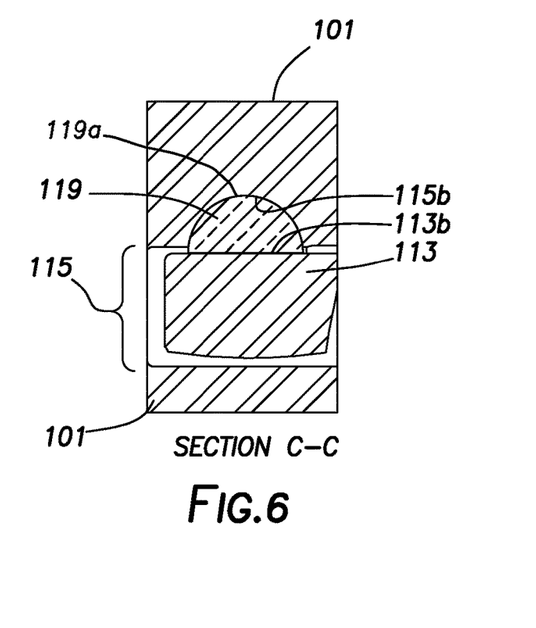
FIG. 6 is a cross section view of the universal joint of FIG. 4 taken at line C-C.
Figure 7:
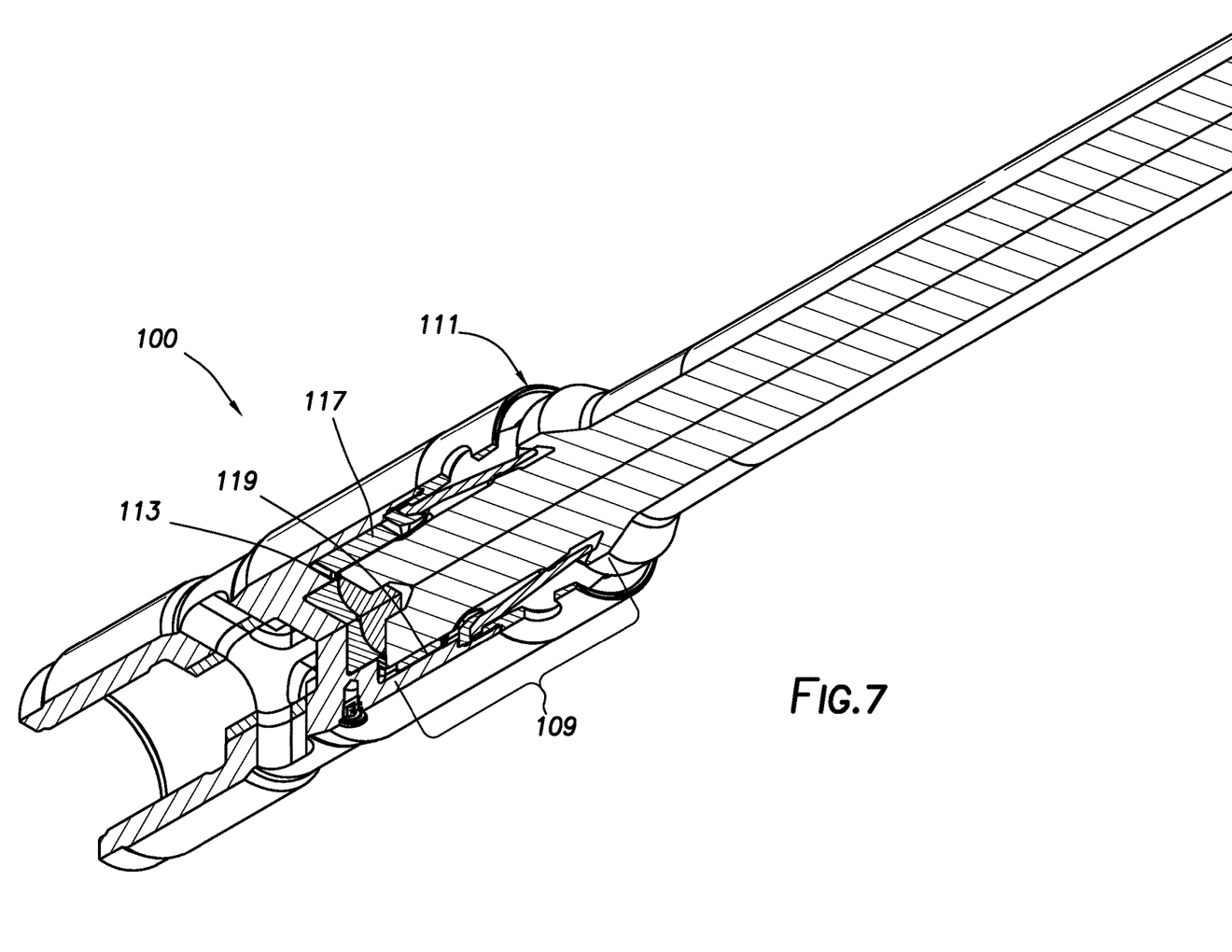
FIG. 7 is a partial quarter-section view of the universal joint of FIG. 2B.

In some embodiments, universal joint 100 may include one or more drive keys 117 and anti-backlash keys 119. Drive keys 117 and anti-backlash keys 119 may be inserts positioned between each lobe 113 and each corresponding recess 115 and may, for example and without limitation, separate and provide bearing surfaces between lobes 113 and recesses 115. In some embodiments, drive keys 117 may be positioned between lobe drive face 113a of each lobe 113 and recess drive face 115a of each corresponding recess 115 of socket 111 as depicted in FIGS. 4-6. In some embodiments, as depicted in FIG. 5, recess drive face 115a may be shaped to receive drive key 117. In some embodiments, for example and without limitation, drive key 117 may include curved portion 117a adapted to fit into a corresponding surface of recess drive face 115a. In some embodiments, curved portion 117a may be substantially semicircular in cross section, allowing, for example and without limitation, drive key 117 to act as a Woodruff key. Such a drive key 117 may, for example and without limitation, self-align to engage with lobe drive face 113a and recess drive face 115a, and may therefore increase the surface area across which torque is transferred through universal joint 100.

In some embodiments, one or more anti-backlash keys 119 may be positioned between lobe back face 113b of each lobe 113 and recess back face 115b of each corresponding recess 115. Anti-backlash keys 119 may, for example and without limitation, take up otherwise open space between lobes 113 and recesses 115 and may therefore reduce or eliminate backlash. In such an embodiment, each lobe 113 is engaged to a corresponding recess 115 at both lobe drive face 113a and lobe back face 113b through drive keys 117 and anti-backlash keys 119, respectively, regardless of the direction of loading of universal joint 100. In some embodiments, anti-backlash keys 119 may impart a pre-loading force between lobe drive face 113a of each lobe and recess drive face 115a of each corresponding recess 115 of socket 111. In some embodiments, as depicted in FIG. 6, recess back face 115b may be shaped to receive anti-backlash key 119. In some embodiments, for example and without limitation, anti-backlash key 119 may include curved portion 119a adapted to fit into a corresponding surface of recess back face 115b. In some embodiments, curved portion 119a may be substantially semicircular in cross section, allowing, for example and without limitation, anti-backlash key 119 to act as a Woodruff key. Such an anti-backlash key 119 may, for example and without limitation, self-align to engage with lobe back face 113b and recess back face 115b, and may therefore increase the surface area across which torque is transferred through universal joint 100 in the case of reverse loading of universal joint 100.

In some embodiments, drive keys 117 and anti-backlash keys 119 may be formed from a material that is less wear-resistant or more susceptible to damage than the material of joint housing 101 and joint shaft 105. Wear caused by operation of universal joint 100 may thereby be more likely to occur to drive keys 117 and anti-backlash keys 119 than to lobes 113 and socket 111, therefore reducing wear to lobes 113 and socket 111. For example and without limitation, in some embodiments, drive keys 117 and anti-backlash keys 119 may be formed from a material that may have less material strength or less resilience; may have a lower yield strength, lower ultimate strength, or lower Young's modulus; or may be more ductile or malleable than lobes 113 and recess 115, or a combination thereof. Because anti-backlash keys 119 take up the space between lobes 113 and recesses 115, damage to universal joint 100 caused by reverse loading may be reduced due to the reduced backlash within universal joint 100.

By reducing backlash, anti-backlash keys 119 may, for example and without limitation, reduce shock loading on joint housing 101 and joint shaft 105 caused by sudden reverse loading on universal joint 100; may reduce wear to drive faces 113a, 115a by reducing radial movement between joint housing 101 and joint shaft 105 by maintaining more consistent alignment therebetween; may reduce operating temperature by reducing heat caused by repeated striking forces between drive faces 113a, 115a allowed by backlash; and may allow for smoother articulation of universal joint 100 due to more constant loading on drive faces 113a, 115a.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A universal joint comprising:
   a joint housing, the joint housing including a socket, the socket including a recess, the recess including a recess drive face and a recess back face;
   a joint shaft, the joint shaft including a head, the head positioned in the socket, the head including a lobe corresponding with the recess of the socket, the lobe including a lobe drive face corresponding with the recess drive face and a lobe back face corresponding with the recess back face;
   a drive key positioned between the lobe drive face and the recess drive face; and
   an anti-backlash key positioned between the lobe back face and the recess back face;
   wherein at least one of the drive key and anti-backlash key is formed as a Woodruff key.

2. The universal joint of claim 1, wherein the drive key and anti-backlash key are formed from a material that is less wear-resistant than materials of the recesses of the joint housing and the lobes of the joint shaft.

3. The universal joint of claim 2, wherein the drive key and anti-backlash key are formed from a material that has less material strength or less resilience a lower yield strength, lower ultimate strength, or lower Young's modulus or is more ductile or malleable than the materials of the lobe and the recess.

4. The universal joint of claim 1, wherein the lobe drive face is engaged to the recess drive face through the drive key and the lobe back face is engaged to the recess back face through the anti-backlash key.

5. The universal joint of claim 4, wherein the anti-backlash key imparts a pre-loading force between the lobe back face and the recess back face.

6. The universal joint of claim 1, wherein the joint housing further comprises a coupler.

7. The universal joint of claim 6, wherein the coupler of the joint housing is a male or female threaded coupler.

8. The universal joint of claim 1, wherein the joint shaft further comprises a shaft coupler.

9. The universal joint of claim 8, wherein the shaft coupler of the joint shaft is a male or female threaded coupler.

10. A downhole tool comprising:
    a mud motor, the mud motor including a stator and a rotor;
    a drive shaft;
    a transmission shaft, the transmission shaft coupled to the rotor and the drive shaft, the transmission shaft coupled to at least one of the rotor or the drive shaft by a universal joint, the universal joint including:
      a joint housing, the joint housing including a socket, the socket including a recess, the recess including a recess drive face and a recess back face, the joint housing mechanically coupled to the rotor or the drive shaft;
      a joint shaft, the joint shaft including a head, the head positioned in the socket, the head including a lobe corresponding with the recess of the socket, the lobe including a lobe drive face corresponding with the recess drive face and a lobe back face corresponding with the recess back face, the joint shaft mechanically coupled to or formed as part of the transmission shaft;
      a drive key positioned between the lobe drive face and the recess drive face; and
      an anti-backlash key positioned between the lobe back face and the recess back face.

11. The downhole tool of claim 10, wherein the drive key and anti-backlash key are formed from a material that is less wear-resistant than materials of the recesses of the joint housing and the lobes of the joint shaft.

12. The downhole tool of claim 11, wherein the drive key and anti-backlash key are formed from a material that has less material strength or less resilience a lower yield strength, lower ultimate strength, or lower Young's modulus or is more ductile or malleable than the materials of the lobe and the recess.

13. The downhole tool of claim 10, wherein the lobe drive face is engaged to the recess drive face through the drive key and the lobe back face is engaged to the recess back face through the anti-backlash key.

14. The downhole tool of claim 13, wherein the anti-backlash key imparts a pre-loading force between the lobe back face and the recess back face.

15. The downhole tool of claim 10, wherein the joint housing further comprises a coupler, the rotor or drive shaft mechanically coupled to the joint housing with the coupler.

16. The downhole tool of claim 10, wherein the joint shaft is formed integrally with the transmission shaft.

17. The downhole tool of claim 10, wherein the joint shaft further comprises a shaft coupler, the transmission shaft mechanically coupled to the joint shaft with the shaft coupler.

18. The downhole tool of claim 10, wherein the transmission shaft is directly coupled to the drive shaft.

19. The downhole tool of claim 10, wherein the transmission shaft is directly coupled to the rotor.

20. The downhole tool of claim 10, wherein the transmission shaft is coupled to both the drive shaft and the rotor by corresponding universal joints.

21. The downhole tool of claim 10, wherein at least one of the drive key and anti-backlash key is formed as a Woodruff key.

\* \* \* \* \*